W. H. Gray.
Let-Off for Looms.

Nº 24,602. Patented Jun. 28, 1859.

Witnesses
John A. Spofford
Luther Robinson

Inventor
W. H. Gray

UNITED STATES PATENT OFFICE.

WILLIAM H. GRAY, OF DOVER, NEW HAMPSHIRE, ASSIGNOR TO HIMSELF, AND LUTHER ROBINSON, OF MELROSE, MASSACHUSETTS.

LET-OFF MOTION FOR LOOMS.

Specification of Letters Patent No. 24,602, dated June 28, 1859.

*To all whom it may concern:*

Be it known that I, WILLIAM H. GRAY, of Dover, in the county of Strafford and State of New Hampshire, have invented certain new and useful Improvements in the Let-Off Motions of Power-Looms; and I do hereby declare that the following is a full, clear, and exact description of the same, reference being had to the accompanying drawings, forming part of this specification, in which—

Figure 2:
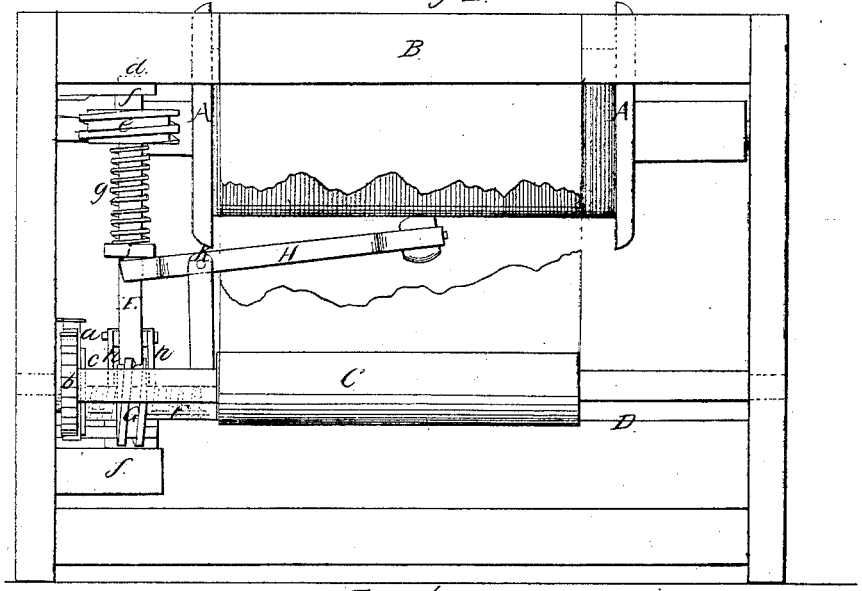
Figure 1:
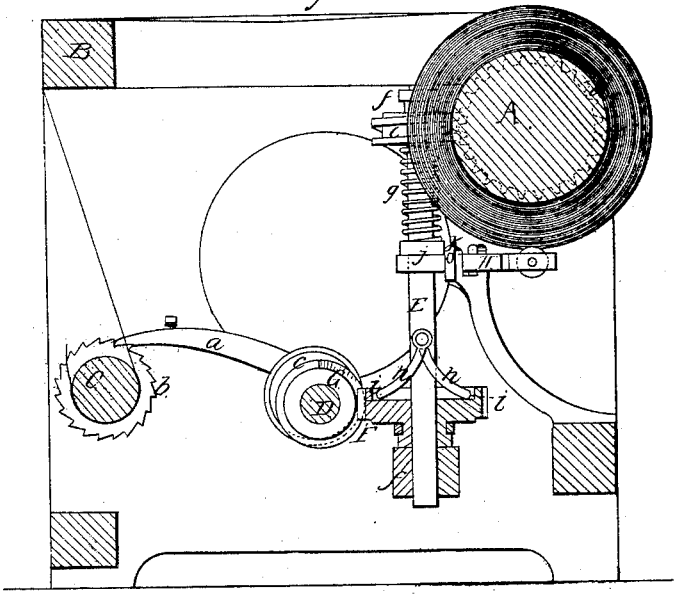

Figure 1 is a vertical sectional view, taken in a plane parallel with the warp, of such parts of a power loom as are necessary to illustrate my invention. Fig. 2 is a front view of the same.

Similar letters of reference indicate corresponding parts in both figures.

This invention consists in a novel mode of applying the let off mechanism in combination with the yarn beam of a power loom, and in certain improvements in such mechanism for the purpose of governing in a very perfect manner the delivery of the yarn from the beam by the tension produced on the cloth and warp by the action of the take-up, and thereby preserving a uniform tension and producing a uniform quality and texture of the cloth.

To enable others skilled in the art to make and use my invention, I will proceed to describe its construction and operation.

A, is the yarn beam; B, the breast beam; C the take up roll, and D the cam shaft, all applied to the loom and arranged in the usual manner. The take up roll may be operated by any positive take up mechanism, but I have shown it operated by means of a pawl $a$ and ratchet wheel $b$, the pawl being operated by an eccentric $c$ on the cam shaft, and the ratchet wheel being fast on the take up roll.

The yarn beam has secured to it at one end a worm gear $d$, which gears with an endless screw $e$ that is fast on an upright shaft E, which works in bearings $f\ f$ attached to the side frame of the loom. This shaft is permitted a limited amount of motion in the direction of its length, and has applied to it a spring $g$, which tends to force it bodily upward and so cause the threads of the endless screw $e$, to push against the teeth of the worm gear $d$, in a direction to turn it backward, or in the opposite direction to that in which it requires to turn to let off the yarn. The said shaft E, has attached to it so as to be compelled to rotate with it, two dogs $h$, $h$ which have a toggle-like arrangement, and which constitute part of a clutch by which to couple with the shaft E, a worm gear F, which is fitted to the said shaft in such a manner as to be capable of turning independently of it, but which is confined so as to be prevented moving along with the said shaft in the direction of its length. The part of the clutch corresponding with $h$, $h$ consists simply of a cavity $i$, $i$ in the upper side of the worm gear F.

The worm gear F derives a continuous rotary motion from an endless screw G on the cam shaft D, so long as the loom remains in operation, the direction of such rotary motion being such that when the shaft E, rotates with the said gear, the endless screw $e$ and worm gear $d$ turn the yarn beam in a direction to let off the yarn; but the said shaft E only rotates with the said worm gear F when there is more than a certain desired degree of tension on the cloth and warp, for when the tension is at or below this point the shaft E is held up by the spring $g$ high enough to hold the part $h$, $h$ of the clutch out of gear, and the yarn beam remains locked by the endless screw $e$, and worm gear $d$, until the desired degree of tension is exceeded in the slightest degree when the tendency of the yarn to draw off from and turn the yarn beam will cause the gear $d$, to press downward upon the endless screw with sufficient force to overcome the upward pressure of the spring $g$ and push down the shaft E far enough to cause the engagement of the two parts of the clutch $h$, $h$, and $i$, $i$, and the revolution of the shaft with the gear F. This revolution of the shaft which produces the letting-off of the yarn continues as long as the tension exceeds in the slightest degree, the desired point and (provided of course that the gearing G, F, and $e$, $d$, are properly proportioned to the take up motion) prevents the tension getting too great, but as soon as the tension gets below this point, the spring $g$ overcomes it and raises the shaft E, high enough to disengage the clutch $h$, $h$, $i$, $i$. The force of the spring may be graduated and thereby made to produce a greater or less tension of the warp, by means of screws or other contrivances.

To make the operation of this let off motion perfect it is necessary that the force exerted by the spring $g$ shall vary in proportion as the quantity of yarn on the yarn beam is greater or less, as it is well understood that the greater the quantity of the yarn on the beam the greater will be the tendency of the beam to turn with a given tension of the warp. To effect the necessary variation in the strength of the spring, I provide for its bearing a collar $j$ which is fitted to slide loosely on the shaft E, and support this collar upon the forked end of a lever H which is supported on a fixed fulcrum K attached to the loom framing and whose other end bears against the surface of the yarn upon the beam. By this method of supporting the spring $g$ its compression is rendered greatest when the quantity of yarn on the beam is greatest, and caused to diminish as the quantity of yarn on the beam diminishes, and if the two arms of the lever are properly proportioned, the force of the spring will always be in the same proportion to the distance of the surface of the yarn from the center of the beam, and consequently to the degree of tendency to turn produced upon the beam by any given degree of tension. One peculiarity of this method of governing the let off motion consists in the oscillating motion that may be permitted to the yarn beam by the spring $g$, during every beat of the lay without effecting any let off, such oscillation being produced by the action in combination with the spring $g$ of the slight variation that is unavoidably produced in the tension of the warp in every beat or pick of the loom by the opening and closing of the shed and beating up of the weft, and the said oscillation preventing the breakage of the warp. The let off, of course, takes place at that point in the beat or pick of the lay when the maximum tension occurs, but only when such maximum tension exceeds the desired degree.

It is obvious that some modification in the arrangement of the parts and character of the gearing may be made without changing the principle of my invention, among which may be mentioned the following: 1st. The shaft E, may be arranged otherwise than in a vertical position and may be driven by a different system or arrangement of gearing from that which I have represented. 2d. A different kind of clutch from that herein described may be used. 3d. The part $h\ h$ or its equivalent of the clutch, and the endless screw $e$ or its equivalent which operates and holds back the yarn beam, may be secured to a sleeve fitted to slide on the shaft E and the spring $g$, applied to the said sleeve instead of to the shaft, and in that case the shaft itself would require no longitudinal motion.

I do not claim the governing of the let-off motion by the tension of the warp or by the variations in the quantity of yarn on the beam. But

What I claim as my invention and desire to secure by Letters Patent, is:—

1. Combining the clutch $h, h, i, i$, or its equivalent, by which motion is imparted to the let-off mechanism, with the yarn beam, by means of a worm gear $d$, on the yarn beam, and an endless screw $e$, and spring $g$, applied substantially as described to the shaft E, which controls the rotation of the beam, and operating as set forth.

2. In combination with the worm gear $d$, endless screw $e$, and spring $g$, applied as described, I claim the lever H, applied between the said spring and the surface of the yarn on the beam and operating substantially as herein specified.

W. H. GRAY.

Witnesses:
 JOHN A. SPOFFORD,
 LUTHER ROBINSON.